March 21, 1933. H. M. SMESTAD 1,902,733
GRAIN TREATING AND ELEVATING DEVICE
Filed July 19, 1930 2 Sheets-Sheet 1
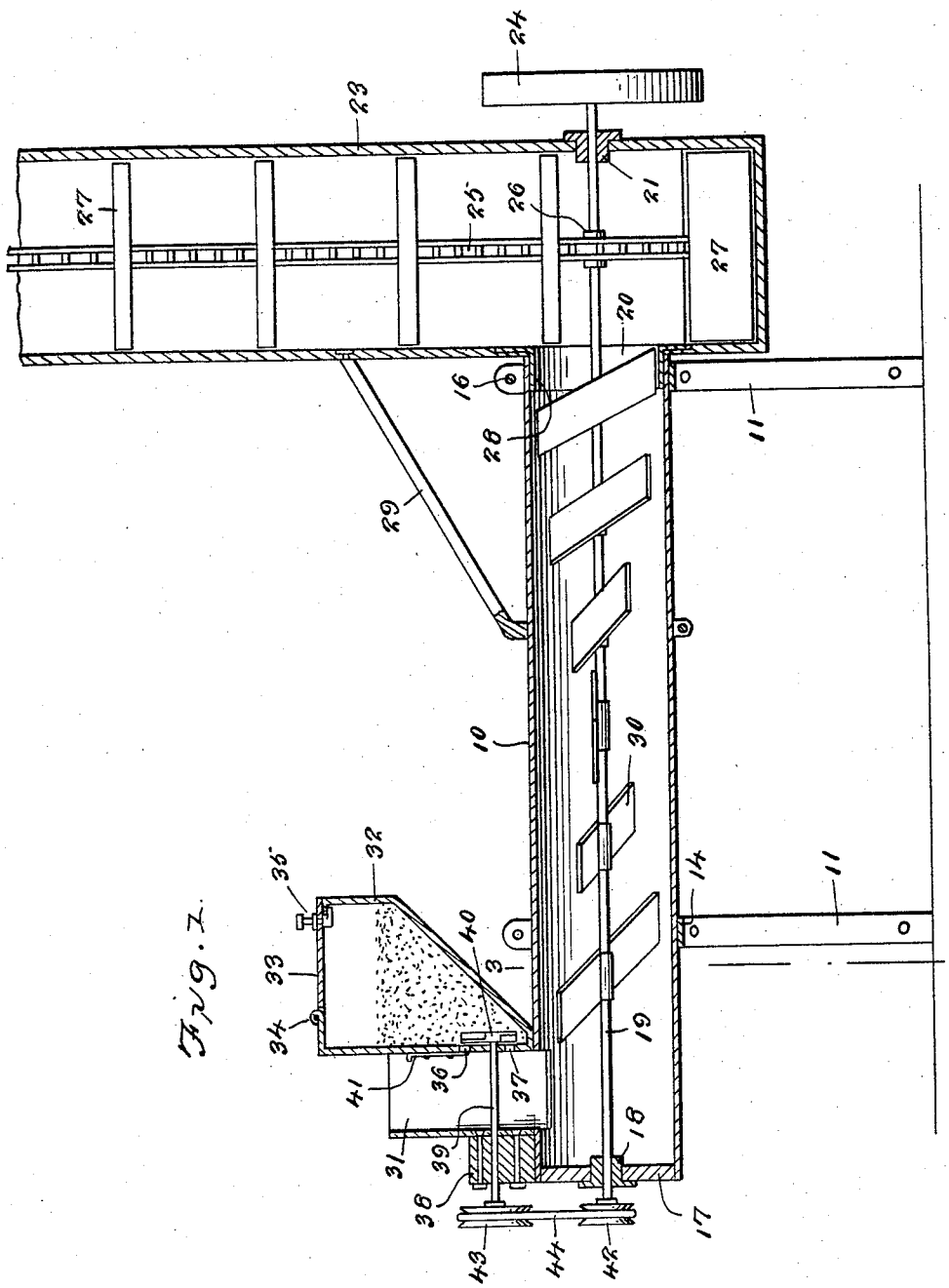

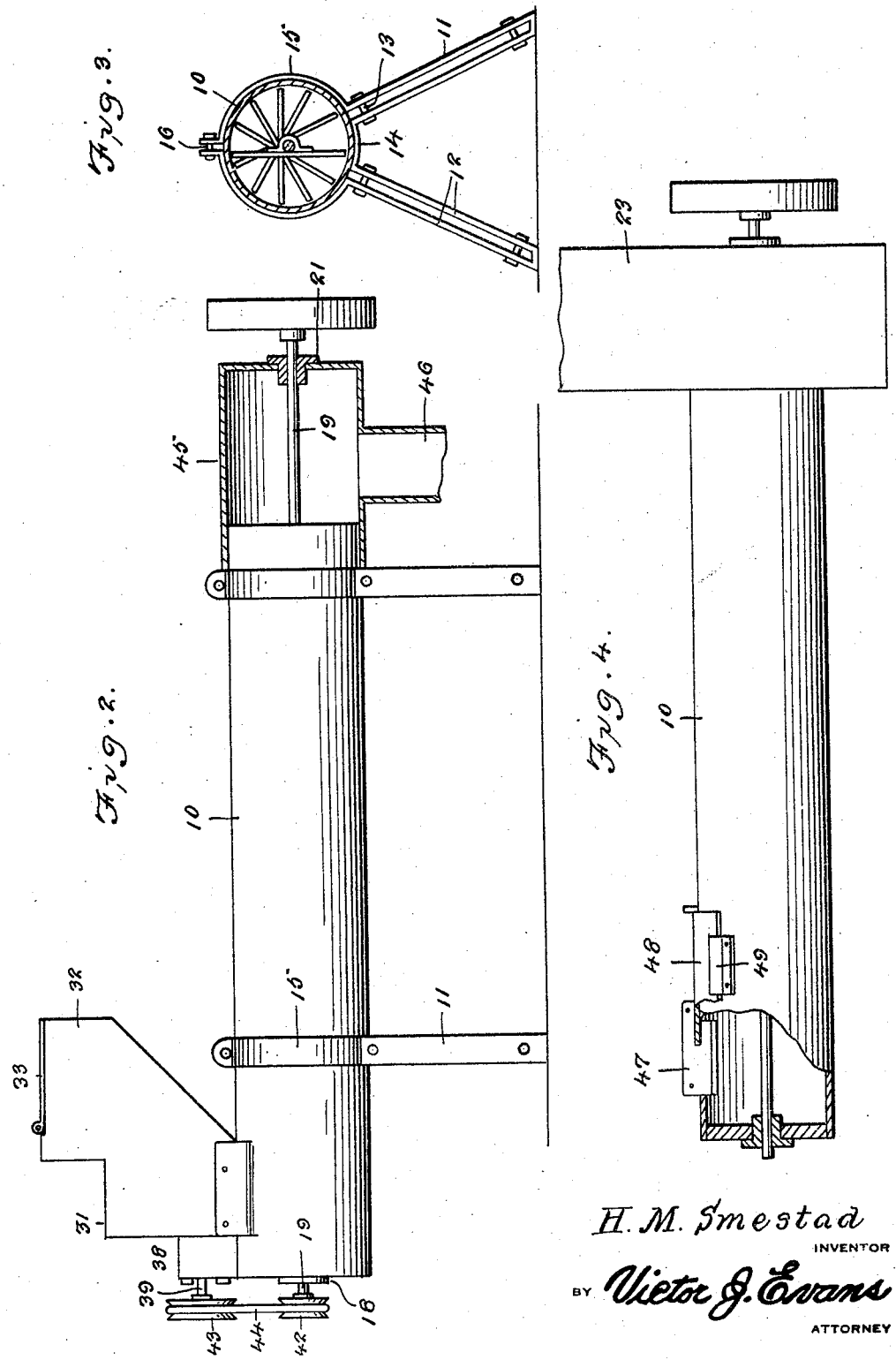

Patented Mar. 21, 1933

1,902,733

UNITED STATES PATENT OFFICE

HANS M. SMESTAD, OF BAINVILLE, MONTANA

GRAIN TREATING AND ELEVATING DEVICE

Application filed July 19, 1930. Serial No. 469,184.

This invention relates to apparatus for the treatment of grain, an object being to provide an apparatus which may be attached to the elevator of a combine or thresher for loading grain into a bin or wagon and for treating the grain for smut during the loading operation.

Another object of the invention is the provision of means for treating grain as it enters a conveyor from the bin, thresher or other source of supply, and for regulating the amount of powder used in the treatment of the grain, in accordance with the amount of grain being handled.

Another object of the invention is the provision of a conveyor of novel construction which will stir up and thoroughly agitate the grain to properly mix the grain and powder for effective treatment.

With the above and other objects in view, the invention further includes the following novel features and details of construction, to be hereinafter more fully described, illustrated in the accompanying drawings and pointed out in the appended claim.

In the drawings:—

Figure 1 is a vertical longitudinal sectional view of the invention.

Figure 2 is a side elevation partly broken away illustrating a different discharge device.

Figure 3 is a section taken substantially on the line 3—3 of Figure 1.

Figure 4 is an elevation partly broken away showing a different type of feed for the conveyor.

Referring to the drawings in detail wherein like characters of reference denote corresponding parts, the reference character 10 indicates a conveyor pipe of suitable length and diameter. This pipe may be supported by spaced legs 11. As shown in Figure 3 of the drawings, these legs may be formed of a single length of material bent to provide spaced parallel members 12 which are connected at their lower ends and which are bridged by bolts 13. The upper ends of the inner members of the legs are connected by an arcuate strap 14, while curved straps 15 extend from the outer members of these legs around the pipe 10 and are adjustably connected by means of a bolt 16. By this means the legs may be readily attached to the pipe and may be adjusted to any desired position.

One end of the pipe 10 is closed by a head 17 and this head carries a bearing 18 for a shaft 19 which extends longitudinally of the pipe. This shaft extends through the discharge end 20 of the pipe and has a bearing 21 in one wall of an elevator 23. A pulley 24 is mounted upon the outer end of the shaft 19. The elevator includes a chain 25 which passes around a sprocket 26 and which carries spaced lifting plates 27 so that grain passing from the discharge end 20 of the conveyor pipe 10 may be carried upward and deposited in a bin or wagon, or other suitable place.

A flanged thimble 28 carried by the elevator 23 extends into the discharge end of the pipe 10 and the latter may be clamped upon this thimble by means of the curved members 15 which extend from the legs 11. An inclined brace 29 connects the conveyor pipe with the elevator.

Carried by the shaft 19 are spaced blades 30. These blades extend across the shaft at an incline and are spirally spaced about the shaft, so that when the latter is rotated, the grain will be lifted and forced longitudinally of the pipe from one blade to the next and will pass outward through the discharge end 20 into the elevator.

Extending into the pipe 10 at one end thereof is a feed chute 31 and arranged adjacent this chute is a hopper 32 which is adapted to contain powder for the treatment of grain. This hopper is provided with a door 33 for the introduction of powder and this door is hinged as at 34 and is provided with a catch 35.

The bottom of the hopper is inclined and the wall which separates the hopper from the feed chute is provided with upper and lower openings 36 and 37 respectively. Powder from the hopper 32 will thus pass into the chute 31 and be mixed with grain passing through the chute. The grain and powder will enter the conveyor pipe 10 and will be taken up by the blades 30 and forced along the pipe in the manner previously explained. During the passage of the grain and powder longitudinally of the pipe, they will be thoroughly mixed so that all of the grain will be effectually treated.

Mounted in a bearing block 38 is a shaft 39. This shaft extends through the chute into the hopper and has mounted upon its inner end blades 40 of different lengths. These blades act to force the powder through the openings into the hopper, the long blade acting to force the powder through the upper opening 36. This opening may be controlled by a slide 41 so as to regulate the amount of powder passing into the chute. In the event of the lower opening 30 becoming clogged, the upper opening 36 may be fully opened and the powder forced therethrough by the long blade 40.

The shaft 19 is provided with a pulley 42 while the shaft 39 is provided with a pulley 43. A belt 44 drives the pulley 43 from the pulley 42.

In Figure 2, the conveyor 10 is disconnected from the elevator and attached to the discharge end 20 of the conveyor is an extension 45 which is provided with a discharge chute 46 whereby the grain may be directed into any suitable receptacle or container.

In Figure 4, the hopper and discharge chute are removed and the opening 47 through which the discharge chute passes is regulated by a slide 48. This slide operates in guides 49 carried by the conveyor 10. With the conveyor arranged as in Figure 4, the feed end may be inserted in a bin of grain and the latter permitted to flow into the conveyor for transfer to the elevator 23 to load the grain into a wagon or other receptacle.

The invention is susceptible of various changes in its form, proportions and minor details of construction and the right is herein reserved to make such changes as properly fall within the scope of the appended claim.

Having described the invention what is claimed is:—

In a device of the character described, a conveyor pipe, legs for the pipe, each leg formed from a single length of material bent to provide spaced parallel members connected at their lower ends, bolts bridging said members, an arcuate-shaped strap formed at the upper ends of the inner members of the legs, curved straps extending from the outer members of said legs around the pipe and adjustably connected together, a head closing one end of the pipe, a vertical feed chute opening into the pipe near its closed end, a hopper located adjacent to the chute and having openings leading thereinto, a shaft journaled centrally of the pipe and having staggered blades working therein, a second shaft journaled exteriorly of the pipe and having blades working within the hopper next to the openings communicating said hopper with the chute, driving connections between said shafts, and an elevator communicative with the shaft at its end opposite the closed end thereof.

In testimony whereof I affix my signature.

HANS M. SMESTAD.